June 30, 1931. T. C. DOBBINS 1,812,141
FLEXIBLE SHAFT COUPLING
Filed Oct. 21, 1929

Inventor
Timothy C. Dobbins.
By
Attorney

Patented June 30, 1931

1,812,141

UNITED STATES PATENT OFFICE

TIMOTHY C. DOBBINS, OF DENVER, COLORADO

FLEXIBLE SHAFT COUPLING

Application filed October 21, 1929. Serial No. 401,292.

This invention relates to improvements in universal or flexible couplings of the type employed where rotary motion its transmitted from a drive shaft to a driven shaft whose axis makes a slight angle with that of the drive shaft and has reference more particularly to a flexible shaft coupling suitable for use in the drive shaft between the engine and the differential of an automobile.

In the construction of automobiles it is customary to employ two universal shaft couplings in the shaft that transmits power from the engine to the differential, although some automobiles employ only a single universal coupling in this shaft.

It is evident that where the drive shafts are provided with the ordinary universal couplings which are made entirely of metal, such as steel, all torque variations will be transmitted from the engine to the rear axle due to the fact that the parts do not yield. For the purpose of preventing vibrations due to torque impulses and for reducing the strains that are produced by sudden torque variations, various types of resilient shaft couplings have been produced which are designed so that they will yield slightly and which will therefore produce a more uniform flow of torque than can be obtained with all metal couplings.

It is the object of this invention to produce a resilient, flexible shaft coupling of a very simple construction which shall have the requisite strength to withstand the strains to which it will be subjected and which will be of small size.

It is another object of this invention to provide a flexible shaft coupling with means for supporting and centering the end of the drive shaft so as to remove strains due to the weight of the drive shaft and to assure that the drive and driven shafts will always retain a predetermined relation, one with the other.

This invention, briefly described, consists in forming the drive shaft from a tube or providing it with an opening at one end for the reception of a resilient flexible power transmitting member which is preferably formed from several layers of rubberized cord fabric such as is used in the construction of automobile tires. The adjacent end of the driven shaft is provided with a flanged cap to which a tubular centering member is secured and to the inside of which a tubular coupling member is splined. The power transmitting member has its other end nonrotatably secured to the coupling member and therefore when the drive shaft rotates, it will subject this member to a torsional strain which will be transmitted by it to the driven shaft. The tubular centering device is of such length that it overlaps slightly the adjacent end of the drive shaft and is provided on its inner surface with spaced flanges between which is located a spacing member which may be either a helical spring, a rubber ring or a suitable ball assembly, that serves to hold the end of the drive shaft in a predetermined relation to the axis of the driven shaft.

Having thus briefly described the invention, the same will now be described in detail and for this purpose, reference will be had to the accompanying drawings in which the invention has been illustrated in its preferred form and in which.

Figure 1:
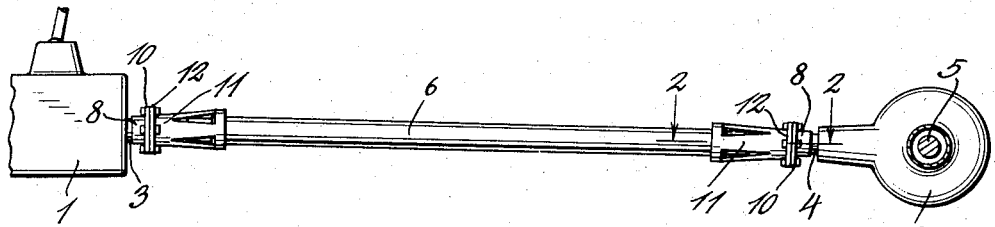
Fig. 1 is a side elevation of an automobile drive shaft which is provided with two of my improved couplings.

In the drawings reference numeral 1 designates the transmission casing of an automobile and 2 the differential housing. The drive shaft which projects from the rear end of the transmission casing has been designated by numeral 3, and the driven shaft that projects forwardly from the differential housing has been designated by numeral 4. The axis of the drive shaft 3 is usually horizontal when an automobile is standing on a flat surface and is located above the axis of the rear axle 5, and therefore when power is to be transmitted from shaft 3 to shaft 4, it must be transmitted at an angle. Since the engine and the transmission casing are mounted on springs their height above the rear axle is continually varying and therefore the angle through which the power must be transmitted is also variable.

It is customary to transmit power from shaft 3 to shaft 4 by means of a drive shaft like that indicated by reference numeral 6 and which is provided at either one or both ends with a universal shaft coupling. The couplings that are most commonly employed are of the type known as knuckle joints and are made entirely of metal with the result that they are rigid and do not yield when subjected to excessive strains or torque variations. This is objectionable for various reasons which have been pointed out above.

In order to overcome the objections which are inherent in the unyielding shaft couplings to which reference has already been made, resilient shaft couplings of the construction which will now be described has been substituted.

Figure 2:
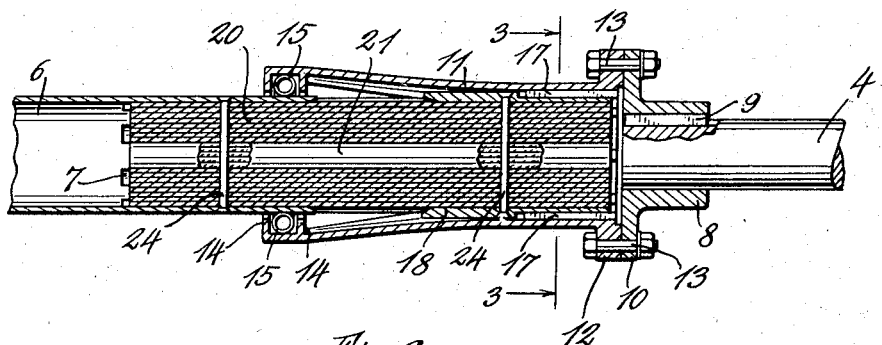
Fig. 2 is a section taken on line 2—2, Fig. 1.
Figures 3, 4:
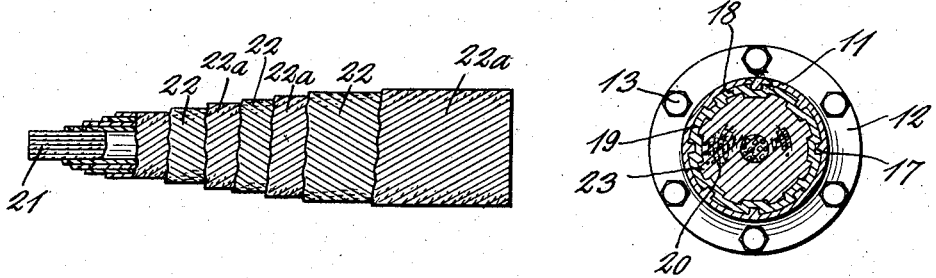
Fig. 3 is a transverse section taken on line 3—3, Fig. 2.
Fig. 4 is a view, partly broken away, showing the construction of the power transmitting member.
Figure 5:
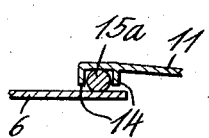
Fig. 5 is a fragmentary section similar to that shown in Fig. 2 and shows a rubber ring in the place of a spring.
Figure 6:
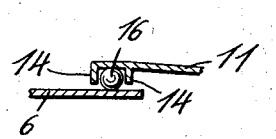
Fig. 6 is a view similar to that shown in Fig. 5 and shows balls used in place of the spring.

In the preferred construction of this invention, shaft 6 is made from a steel tube as it is well known that for the same weight, a tubular member is stronger than a solid one and by making the shaft 6 tubular, a reduction in weight can be effected. The inner surface of shaft 6 is provided near each end with spaced grooves or splines 7, for a purpose which will hereinafter appear. The end of the driven shaft 4 is provided with the usual flange coupling 8 which is held against rotation by means of a key 9. Secured to the flange 10 is a centering sleeve 11. This sleeve has an outwardly extending flange 12 that cooperates with flange 10 to which it is secured by means of bolts 13. The centering sleeve is of such length that it projects over the adjacent end of the drive shaft 6 and is provided on the inner surface of its free end with two inwardly extending flanges 14, which are spaced apart a short distance. Located in the space between the flanges 14 is a ring 15 which has been shown in Fig. 2 as consisting of a helically wound wire spring that is cut the proper length and placed in the space between the flanges. Instead of a spring 15, a rubber ring 15a may be used in the manner shown in Fig. 5. In Fig. 6 balls 16 have been shown in the place of the spring 15 and the ring 15a. The inner diameter of flanges 14 is slightly greater than the outside diameter of the drive shaft and the latter rests on the inner surface of the spring 15 in the manner shown in Fig. 2. The end of the centering sleeve which is nearest the flange 12 is provided with inwardly extending splines 17 which cooperate with corresponding grooves in the outer surface of the tubular coupling member 18. Member 18 is provided on its inner surface with a plurality of parallel grooves 19 that are staggered with relation to the grooves on its outer surface. For the purpose of transmitting power from the drive to the driven shaft, I have provided a resilient, flexible power transmitting member 20. This power transmitting member is formed from rubberized cord fabric of the type employed in the manufacture of automobile tire casings. The center of this member is formed by a core 21 which is made from a plurality of cords laid lengthwise. About the central core cord fabric is wrapped in separate layers, there being enough layers to build up the diameter of the member to such an extent that it will fit the inside of the shaft 6 and of the coupling member 18. The different layers of cord fabric have been designated by reference characters 22 and 22a. Those layers that have been designated by reference numeral 22 have the cord inclined in one direction, while those that are designated as 22a are inclined in the opposite direction in the manner shown in Fig. 4. This assembly is vulcanized so as to give it the cure which is best suited for this particular purpose. The outer surface of member 20 is preferably formed with parallel ribs or splines 23 that are adapted to fit the grooves in the interior of the drive shaft and of the coupling member 18. The interlocking action produced by the splines 23 and the grooves prevents relative rotation between the shaft and the power transmitting member 20. Pins 24 may be provided in the manner shown in Fig. 2 and these serve not only to prevent relative rotation, but also holds the parts against longitudinal movement.

Let us now consider that the parts have been assembled in the manner described and shown, and that shaft 6 is rotated by means of power derived from the automobile engine and transmits power to the driven shaft 4. Before shaft 4 will rotate, member 20 will have to be twisted through a small angle in order to produce the necessary torque to overcome the resistance offered by shaft 4. As soon as member 20 is subjected to a torsional strain, the cords in the layers whose cords extend in the direction of the twist produced by the torque will be put under tension, while the cords in the other layers will be put under compression with the result that the member will twist only through a very small angle because the cords are non-elastic. The power transmitting member can be made as large as desired but owing to the great strength of the cords and the large number employed, a member of sufficient strength can be made without increasing the diameter to a greater extent than that indicated in the drawings. The free ends of shaft 6 are supported by the springs 15 located in the centering sleeves, all in the manner shown in Figs. 1 and 2. By supporting the ends of the drive shaft the strains which would otherwise be produced due to the weight of the shaft, will be eliminated and the axis of the drive shaft will always have a definite relation to the axis of the driven shaft and therefore the couplings will operate with the least possible strain.

I want to call particular attention to the fact that with couplings of this kind, no grease is required, which eliminates one highly objectionable feature of the present coupling. Due to the resiliency of these couplings, the car will be cushioned against engine vibrations and the torque impulses will therefore be smoothened whereby a better driving action will be obtained than with the present rigid couplings. This coupling is especially desirable in starting because it is well known that when an engine is cold, it does not run as smoothly as it otherwise does, and is therefore liable to produce a jerky motion, which is entirely overcome when couplers of this construction are employed. The strains that are produced when the clutch is suddenly thrown in, as it is when starting the car, are taken up by the resilient couplings described herein which therefore serves to relieve the mechanical parts of the excessive strains thus produced.

Attention is called to the small size of these couplings compared with the ordinary joint couplings, and it will be seen from the drawings, that aside from the center-sleeve, this coupling is of no greater diameter than the shaft, and since the coupling sleeve needs to be only slightly greater than the diameter of the shaft, the outside diameter of this coupling can be kept comparatively small.

I wish to call attention to the fact that this coupling is reversible and that the terms, "driving shaft" and "driven shaft" are interchangeable as power can be transmitted in either direction.

Having described my invention what is claimed as new is:

1. A flexible coupling for shafts comprising, in combination, a shaft having one end provided with an axial opening, a second shaft having one end provided with an extension having an axial opening, a flexible power transmitting member having its ends nonrotatably secured in the openings and a hollow centering device secured at one end to one of the shafts and having its other end encircling the adjacent end of the other shaft.

2. A flexible shaft comprising, in combination, a driving shaft and a driven shaft, each having one end provided with an axial opening, a flexible and resilient power transmitting member having its ends nonrotatably secured in the openings in the ends of the shafts, and a tubular centering device secured at one end to one of the shafts and encircling the power transmitting member and the adjacent end of the other shaft, the inner surface of the free end of the centering device having means for engaging the outer surface of the shaft over which it extends whereby the ends of the two shafts will be maintained in alignment with each other.

3. A flexible shaft coupling comprising, in combination, a shaft having one end provided with an axial opening, a second shaft having one end provided with an extension having a cylindrical opening, an elongated power transmitting member of resilient flexible material having its ends secured in the openings means for preventing relative rotation between the shafts and the corresponding ends of the power transmitting member and a tubular centering device nonrotatably secured to one of the shafts and enclosing the power transmitting member and the adjacent end of the other shaft, the end of the centering device that encircles the end of the shaft being provided with means for engaging the outer surface of the shaft that it encircles and which serves as a support for that end of the shaft.

4. A flexible coupling for transmitting rotary motion from one axis to an angularly related intersecting axis which comprises, a drive shaft having one end provided with an axial opening, a driven shaft having one end provided with a coupling member having a cylindrical opening, a flexible cylindrical power transmitting member having one end located in the opening in the drive shaft and the other located in the opening in the coupling member, means for holding the power transmitting member from rotation with respect to the drive shaft and the coupling member and means carried by the coupling member and encircling the adjacent end of the drive shaft for supporting the latter.

5. A flexible coupling for transmitting rotary motion from one axis to an angularly related intersecting axis which comprises, a drive shaft having one end provided with an axial opening, a driven shaft having one end provided with a coupling member having a cylindrical opening, a flexible cylindrical power transmitting member having one end located in the opening in the drive shaft and the other located in the opening in the coupling member, means for holding the power transmitting member from rotation with respect to the drive shaft and the coupling member and means carried by the coupling member and encircling the adjacent end of the drive shaft for supporting the latter, said last named means comprising a tubular member nonrotatably and slidably connected with the coupling member and provided at its free end with an inwardly extending flange adapted to serve as a support for the adjacent end of the drive shaft.

6. A device for transmitting power from a rotary drive shaft to a driven shaft that rotates on an axis that intersects the axis of the drive shaft and makes an angle with the latter, comprising, a coupling member secured to one of the shafts, said coupling having an axial cylindrical opening whose inner surface has a plurality of longitudinally extending spaced grooves, the other shaft having a cylindrical opening whose inner surface has a plurality of spaced parallel grooves, a flexible resilient power transmitting member having one end located in the opening in the drive shaft and the other end located in the opening in the coupling member, said resilient member having portions extending into the grooves in the shaft and coupling member for interlocking the three parts and for holding them against relative rotation, and means secured to the coupling member for supporting the end of the other shaft.

7. A flexible coupling for transmitting rotary motion from a shaft rotating about one axis to a shaft rotating about an axis that intersects it at an angle, said coupling device comprising a short tubular member having its outside surface provided with spline grooves extending longitudinally thereof, a shaft terminating adjacent one end of the tubular member, a cylindrical resilient power transmitting member having one end nonrotatably secured in the end of the shaft, and a centering device secured to the short tubular member and encircling the power transmitting member, the outer end of the centering device having two spaced inwardly extending flanges between which is located movable spacing elements that are adapted to contact with the outside of the shaft to hold the same in centered position.

In testimony whereof I affix my signature.

TIMOTHY C. DOBBINS.

CERTIFICATE OF CORRECTION.

Patent No. 1,812,141.　　　　　　　　　　　Granted June 30, 1931, to

TIMOTHY C. DOBBINS.

It is hereby certified that the above numbered patent was erroneously issued to the inventor said "Dobbins", as owner of said invention, whereas said patent should have been issued to the inventor said Dobbins and S. H. Bassow, of Denver, Colorado, said Bassow being assignee of one-half interest in said invention, as shown by the records of assignments in this office; and that the said Letters Patent should be read with this correction therein that the same may conform to the record of the case in the Patent Office.

Signed and sealed this 11th day of August, A. D. 1931.

(Seal)　　　　　　　　　　　　　　　　　　　Wm. A. Kinnan,
　　　　　　　　　　　　　　　　　　Acting Commissioner of Patents.